United States Patent [19]

Markley et al.

[11] 4,326,193

[45] Apr. 20, 1982

[54] TERMINAL WITH INTERCHANGEABLE APPLICATION MODULE

[75] Inventors: Theodore J. Markley, Mentor; Daniel J. Galdun, Huntsburg; Charles E. Clark, Eastlake; Robert G. Henderson, Wickliffe; Frank W. Jencen, Cleveland, all of Ohio

[73] Assignee: Allen-Bradley Company, Milwaukee, Wis.

[21] Appl. No.: 75,175

[22] Filed: Sep. 12, 1979

[51] Int. Cl.³ .............................................. G06F 3/02
[52] U.S. Cl. ........................... 340/365 R; 235/145 R; 312/7.2; 340/365 VL
[58] Field of Search ..................... 340/365 R, 365 VL; 339/31 R, 44 R, 45 R, 65; 312/7 TV; 400/682, 692, 473, 714, 676, 677; 235/145 R, 146; 178/17 C; 179/90 K; 364/200 MS File, 900 MS File

[56] References Cited

U.S. PATENT DOCUMENTS

| | | | |
|---|---|---|---|
| 1,355,819 | 10/1920 | De Clamecy | 400/682 |
| 3,381,276 | 4/1968 | James | 364/900 |
| 3,394,368 | 7/1968 | Carr et al. | 340/365 VL |
| 3,573,749 | 4/1971 | Smith et al. | 364/900 |
| 3,605,285 | 9/1971 | Bendaniel et al. | 35/8 A |
| 3,717,870 | 2/1973 | Mathews et al. | 340/365 VL |
| 3,921,161 | 11/1975 | Baer | 340/147 P |
| 3,971,925 | 7/1976 | Wenninger et al. | 364/900 |
| 4,107,784 | 8/1978 | Van Bemmelen | 340/365 VL |
| 4,156,928 | 5/1979 | Inose et al. | 364/900 |
| 4,208,081 | 6/1980 | Kekas et al. | 339/31 R |

*Primary Examiner*—James J. Groody
*Attorney, Agent, or Firm*—Quarles & Brady

[57] ABSTRACT

A CRT terminal includes a main unit which houses circuitry and the CRT display. An application module which includes a keyboard plugs into the front of the main unit and electrically connects to its circuitry. A flexible membrane keyboard is employed which includes a keyboard overlay that is easily changed to provide keyboard symbols appropriate to a wide variety of different applications. Resilient bumpers extend completely around the main unit to facilitate its use in industrial applications where physical abuse is common.

9 Claims, 11 Drawing Figures

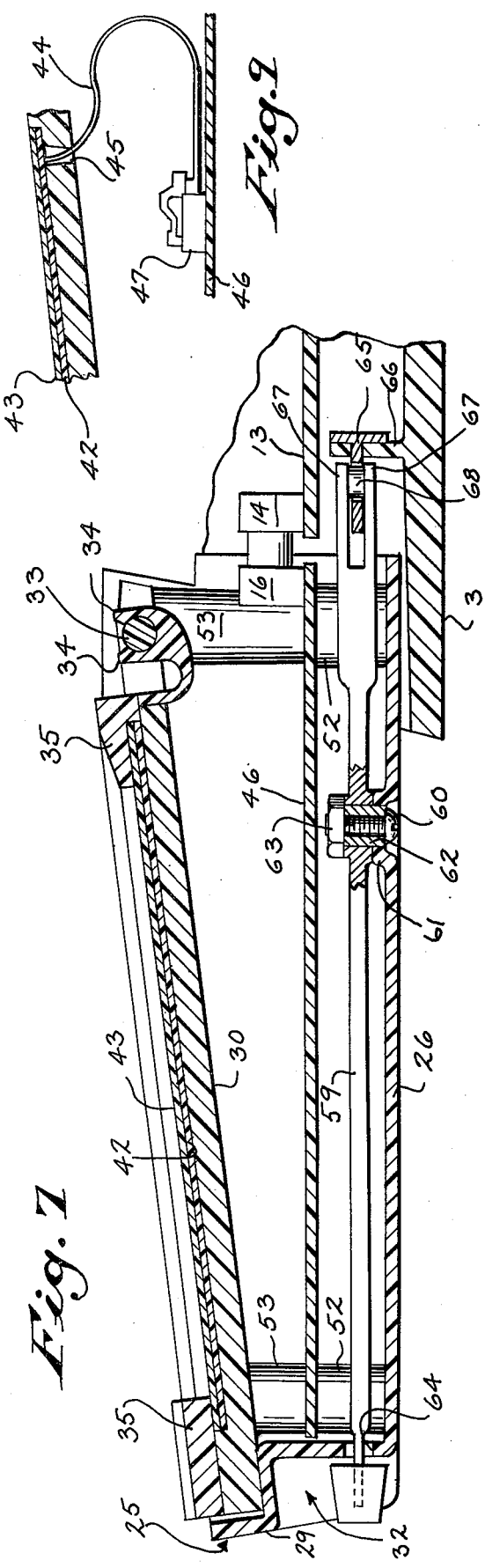

TERMINAL WITH INTERCHANGEABLE APPLICATION MODULE

BACKGROUND OF THE INVENTION

The field of the invention is computer terminal equipment, and particularly, display terminals suitable for industrial applications.

Computer terminals are commercially available in a wide variety of configurations. The most common configuration includes a cathode ray tube display (CRT) and a keyboard which may either be attached to the display or contained in a separate housing that is electrically connected to the display. Such CRT terminals also include one or more serial communications ports which may be connected to a similar port on another piece of equipment such as a computer, process controller, or programmable controller.

Although the CRT display is very general purpose, the same cannot be said of the keyboard. For many commercial applications a typewriter keyboard is appropriate, but there are many instances in industrial applications where special purpose mnemonics, symbols or fonts are used and in which a standard alphanumeric keyboard becomes awkward. One such application, for example, is the input of control program data into a programmable controller.

Filed on even date herewith is a copending U.S. patent application entitled "Industrial Terminal" in which the circuitry is described for a multi-purpose terminal. Circuitry for driving the CRT display and receiving data at serial I/O ports is provided on a main circuit board. This portion of the circuitry is very general purpose in nature and separate circuitry for "tailoring" the terminal to a specific application is provided on a separate application module. The application module also includes the data entry apparatus peculiar to that application, which in most instances is a keyboard with suitable symbols.

SUMMARY OF THE INVENTION

The present invention relates to the construction of a terminal in which the data entry means is mounted on an application module that is removable from the main unit. More specifically, the terminal includes a main unit having a front bezel through which a display device can be viewed and an opening through which connections can be made to circuitry in the main unit. An application module which mounts data entry means attaches to the bezel and it includes an electrical connector, guide means for aligning the electrical connector to make connection with the circuitry in the main unit, and fastening means manually operable to secure the application module to the main unit.

A general object of the invention is to provide a removable application module for a terminal. The main unit is provided with guideways which slidingly receive guide posts on the application module. This structure serves not only to align an electrical connector on the application module with a mating connector on the main unit, but it also transmits bending forces which may be applied to the application module to the frame of the main unit. A manually operable fastener provides a force which pulls the application module into electrical connection with the main unit and holds it securely in place.

Another object of the invention is to provide an application module with interchangeable keyboards. The application module includes a housing with a top surface that supports a flexible membrane keyboard comprised of a switch matrix and a keyboard overlay. A keyboard retainer frame hinged to the module housing holds the flexible membrane keyboard in place and it may be lifted by the user to allow replacement of the keyboard overlay. Keyboard overlays of different configurations and fonts may thus be employed on the terminal making it usable in a wide variety of applications.

Yet another object of the invention is to provide a terminal which is suitable for industrial use. The main unit is substantially rectangular in shape and it includes a pair of elastic bumpers which each extend completely around the main unit. The bumpers provide resilient support regardless of the orientation of the terminal when it is set down on a surface and they provide attractive accent lines.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 7 is a view in cross section taken on the plane 7—7 indicated in FIG. 6, FIG. 8 is a view in cross section taken along the plane 8—8 indicated in FIG. 6., FIG. 9 is a view in cross section taken along the plane 9—9 indicated in FIG. 6, FIG. 10 is a view in cross section taken through a forward bumper which forms part of the terminal of FIG. 1.

DESCRIPTION OF THE PREFERRED EMBODIMENT

Figure 1:
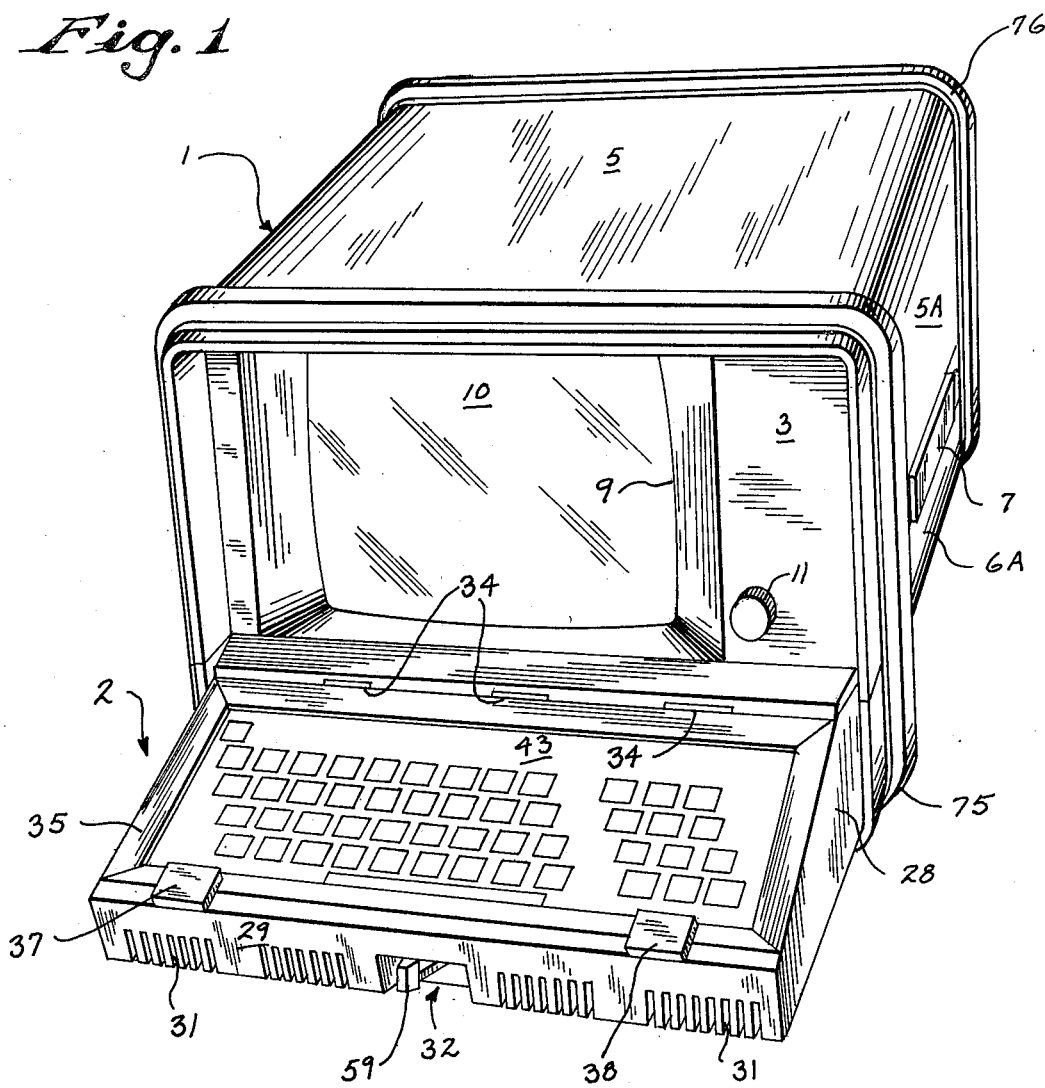
FIG. 1 is a perspective view of the preferred embodiment of the invented terminal.
Figure 2:
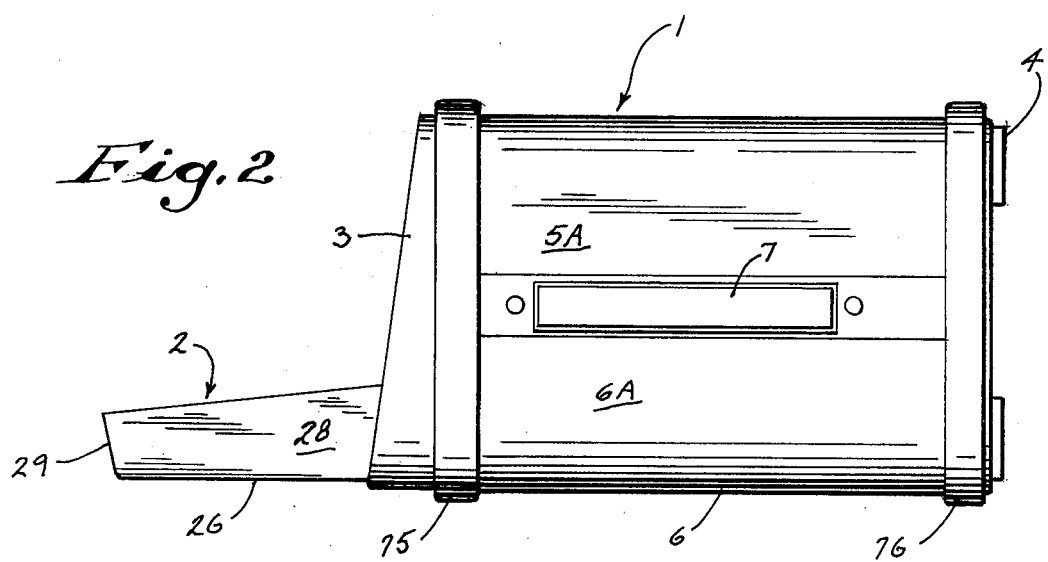
FIG. 2 is a side elevation view of the terminal of FIG. 1.
Figure 3:
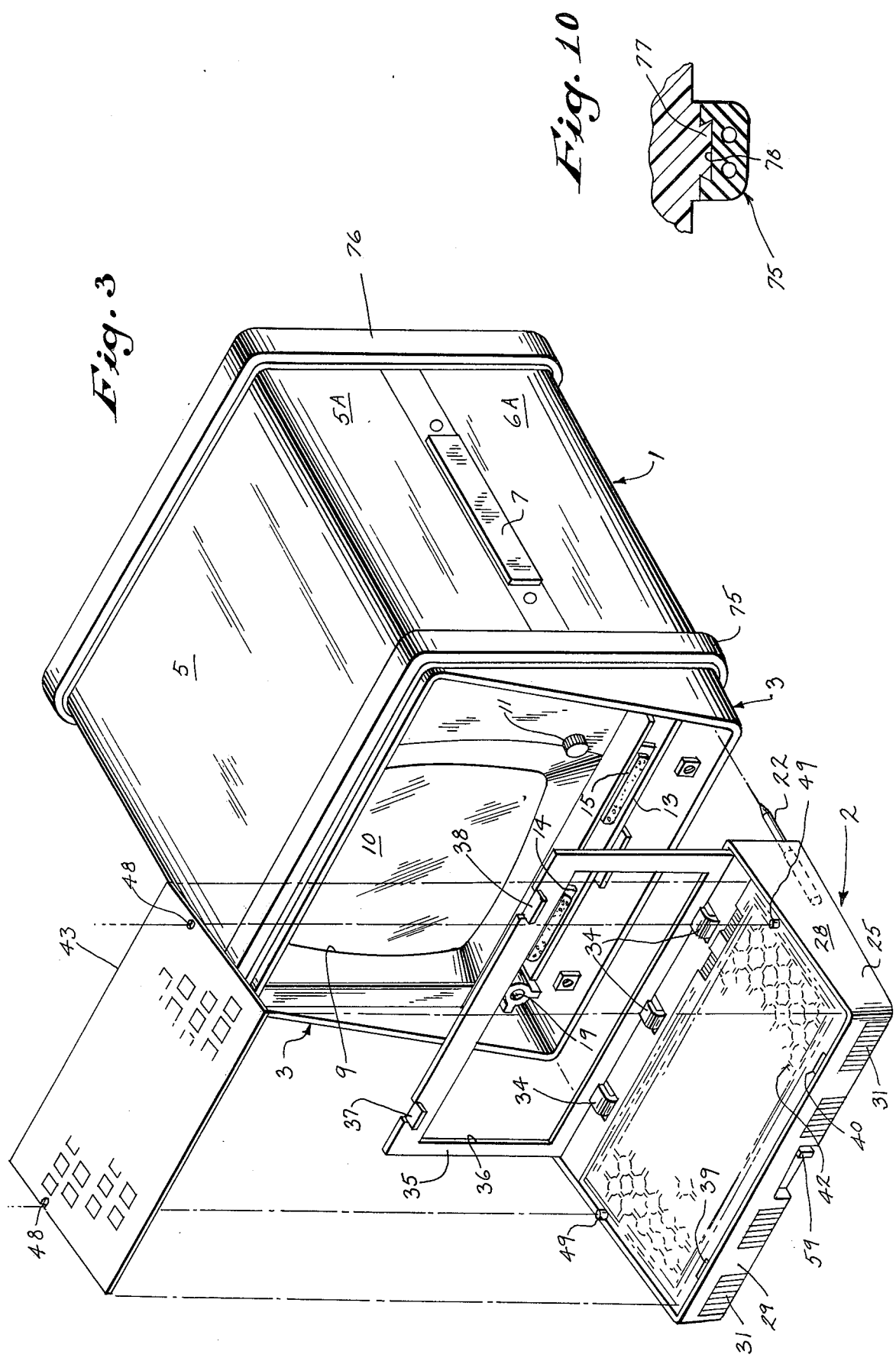
FIG. 3 is an exploded perspective view of the terminal of FIG. 1.

Referring particularly to FIGS. 1-3, the preferred embodiment of the invention is a terminal intended for industrial use which includes a substantially rectangular main unit 1 and an application module 2 which connects to the front of the main unit 1. The main unit 1 is constructed around a wire frame, or chassis (not shown in the drawings) to which a two-part molded plastic bezel 3 and a molded plastic back 4 connect to form the front and back of the main unit 1. A sheet metal top cover 5 fastens to the wire frame to not only enclose the top surface of the main unit 1, but also, to extend downward to form the upper portion 5A of the left and right sides of the main unit 1. Similarly, a sheet metal lower cover 6 encloses the bottom of the main unit 1 and it extends upward along each side to form the lower portion 6A of the left and right sides of the main unit 1. At the juncture of the covers 5 and 6 on the right hand side of the main unit 1 is a handle 7 which is securely fastened to the chassis. The bezel 3, the back 4 and the covers 5 and 6 thus substantially enclose the electronic circuitry in the main unit 1 to protect it from the harsh industrial environment and the handle 7 provides a convenient means for carrying the terminal from one application to the next.

Figure 4:
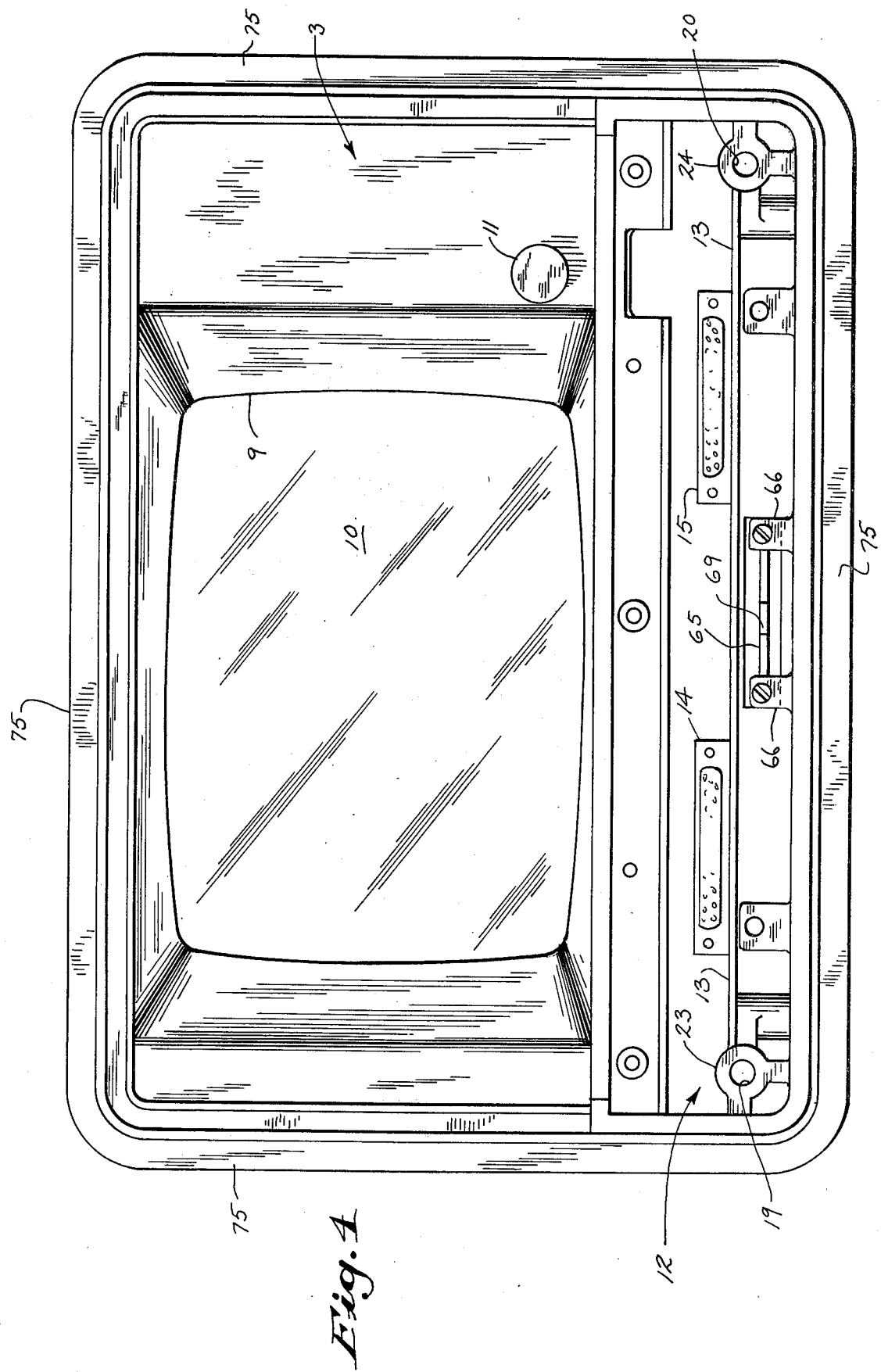
FIG. 4 is a front elevation view of the main unit which forms part of the terminal of FIG. 1.
Figure 5:
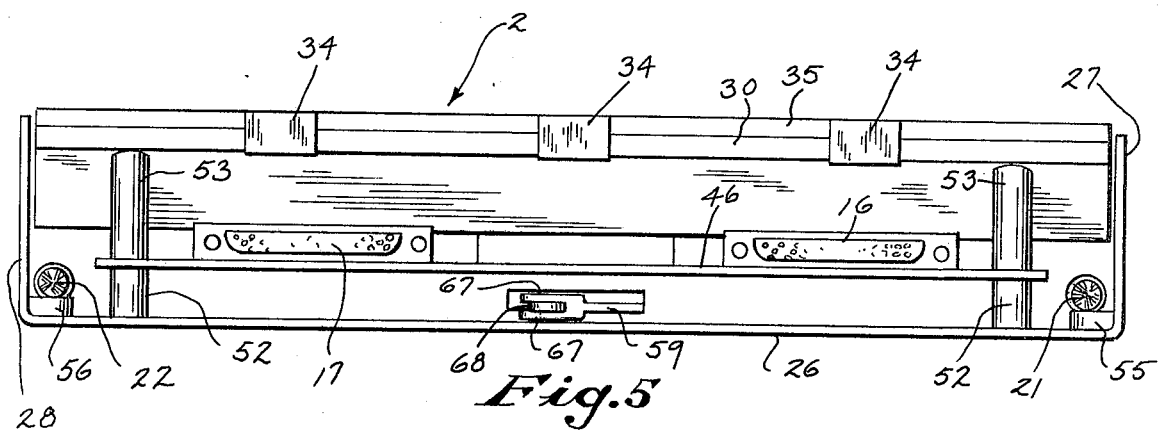
FIG. 5 is a rear elevation view of the application module which forms part of the terminal of FIG. 1.

Referring particularly to FIGS. 3-5, the bezel 3 provides a large rectangular opening 9 in its surface through which a cathode ray tube screen 10 can be viewed. Alongside the opening 9 is a much smaller opening through which the shaft of an intensity control (not shown in the drawings) extends. A knob 11 is attached to this shaft and it can be easily adjusted by the user to control the brightness of the display 10. Below these openings is a large opening 12 which is located along the bottom edge of the bezel 3 and which extends completely across its width. The opening 12 is in the same plane as a main circuit board 13 which is contained within the main unit 1 and which mounts the electronics for the main unit 1. A pair of electrical connectors 14 and 15 fasten to the main circuit board 13 and these face outward through the opening 12 to connect with mating connectors 16 and 17 in the application module 2. All electrical connections between the main unit 1 and the application module 2 are made through the connectors 14-17.

Alignment of the application module 2 within the opening 12 is provided by a pair of circular cylindrical guideways 19 and 20. As shown best in FIGS. 4, 6 and 8, the guideways 19 and 20 are molded as an integral part of the bezel 3 and are located at the lefthand and righthand extremities of the opening 12. The guideways 19 and 20 are aligned along parallel longitudinal axes and they are spaced apart to receive mating guideposts 21 and 22 that are mounted on the application module 2. The molded bosses 23 and 24 which define the guideways 19 and 20 have considerable mass and considerable axial length to not only align the application module 2, but to also provide support for the application module 2 by transmitting bending forces to the frame of the main unit 1. The guideways 19 and 20 may be tapered in the axial direction to ease insertion of the guideposts 21 and 22 and shapes other than circular cylindrical may also be employed with equal success.

As shown best in FIGS. 3 and 5-9, the application module 2 includes a molded plastic housing 25 which is shaped to form a bottom 26, vertical left and right sidewalls 27 and 28, an upturned front wall 29, and a separate top 30. Slots 31 are formed along the front wall 29 to allow the free flow of cooling air to the circuitry inside the module 2 and a cavity 32 is formed in the front wall 29 by a recess which is located at its middle. Three hinge posts 33 are formed along the back edge of the top 30 and these receive three corresponding sets of fingers 34 which are integrally molded to a keyboard retainer frame 35. The frame 35 is rectangular in shape and it has a large window 36 which lays over the top 30 of the module housing 25 when the retainer frame is swung downward into an operating position. A pair of clasps 37 and 38 are formed on the outer edge of the keyboard retainer frame 35 and these snap into slots 39 and 40 formed in the top 30 to hold the frame 35 in place.

As shown best in FIGS. 3, 7 and 9, the top 30 of the module housing 25 is recessed slightly over its middle portion to receive a flexible membrane keyboard. The keyboard includes a five by fourteen switch matrix 42 and a keyboard overlay 43. The switch matrix 42 includes two ribbons 44 containing conductive leads which connect to the switch matrix 42 and which extend down through openings 45 in the top 30 to make connection with a circuit board 46 mounted within the module housing 25. As shown in FIG. 9, connection is made by a pair of connectors 47 which are soldered directly to the circuit board 46.

Laid loosely on top of the switch matrix 42 is the keyboard overlay 43. The keyboard overlay 43 is comprised of a first sheet of flexible plastic on which symbols for the keyboard are printed and a second sheet of less flexible plastic material which defines the boundaries for each key. It fits within the recess formed in the top 30 and it includes a pair of guide holes 48 which fit snuggly over corresponding guide pins 49. The guide pins 49 extend upward from the top 30 on its lefthand and righthand edges and they serve to align the keyboard overlay 43.

It is one of the advantages of the present invention that the keyboard overlay 43 can be easily changed to provide the user with a variety of keyboard key arrangements and key symbols. Consequently, a particular overlay 43 may define only a few keys which are aligned over a few corresponding switches in the switch matrix 42, whereas another overlay 43 may define a large number of keys. These overlays 43 may be exchanged by swinging the retainer frame 35 upward as shown in FIG. 3, removing one overlay 43 and replacing it with another. The retainer frame 35 is then swung back into its operating position in which the overlay 43 and switch matrix 42 are sandwiched between the retainer frame 35 and the top 30 of the module housing 25.

Referring particularly to FIGS. 5 and 7, the circuit board 46 in the application module 2 is mounted such that it is aligned with the circuit board 13 in the main unit 1 when the application module 2 is fastened in place. The circuit board 46 is supported by four lower posts 52 which extend upward from the housing bottom 26 and four upper posts 53 which extend downward from the housing top 30. Screws (not shown in the drawings) extend upward through the lower posts 52 and through aligned openings in the module circuit board 46 into threaded engagement with the upper posts 53. These screws not only fasten the circuit board 46 in place, but they also fasten the housing top 30 to the remainder of the application module housing. For a detailed description of the electronic circuitry on the circuit board 46, reference is made to the above cited copending application entitled "Industrial Terminal".

Figure 6:
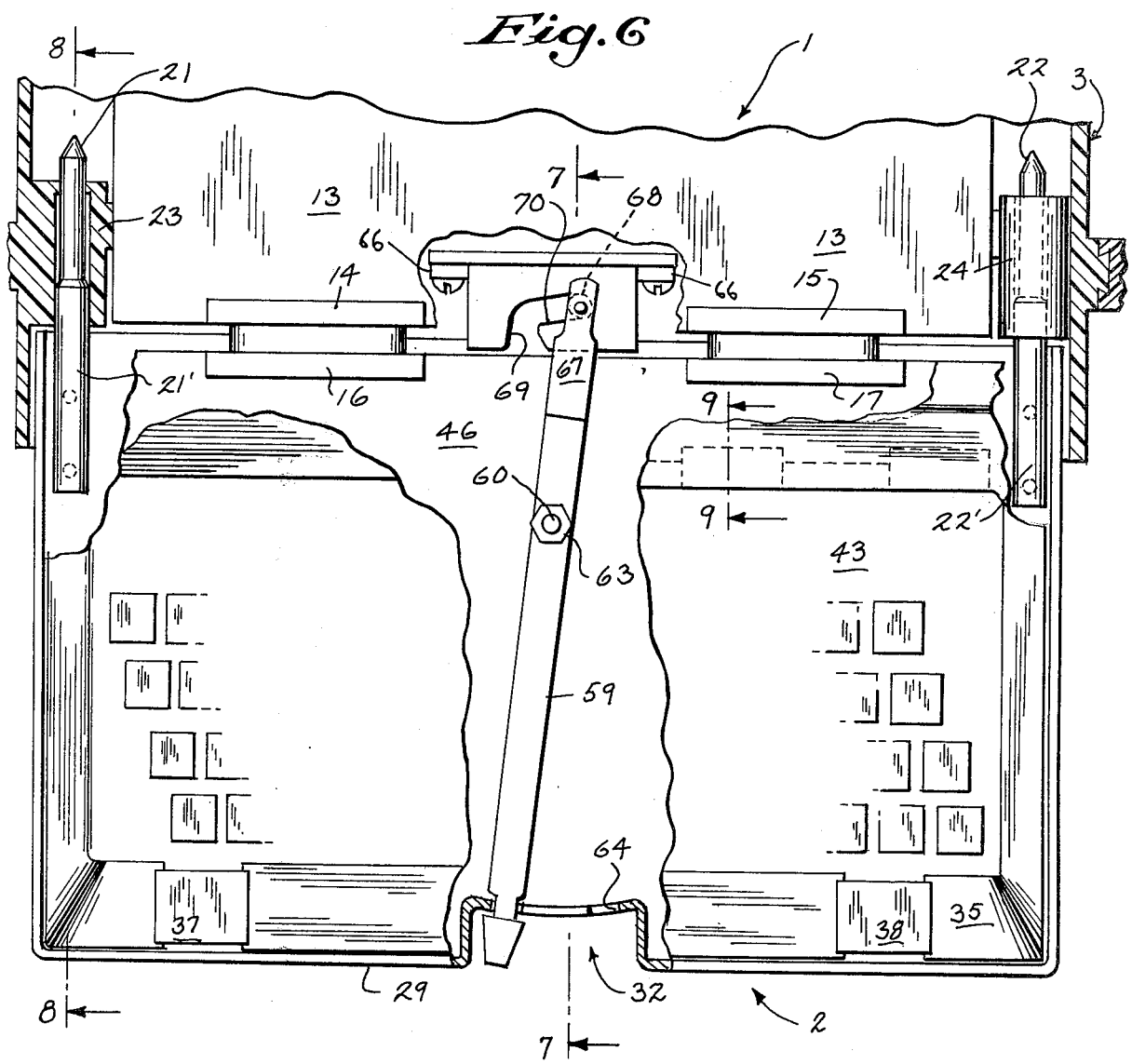
FIG. 6 is a partial top view of the terminal of FIG. 1 with parts cut away to show the connection of the application module to the main unit.

As shown best in FIGS. 5, 6 and 8, the guide-posts 21 and 22 are fastened to bosses 55 and 56 which are integrally molded to the bottom 26 of the module housing 25. The bosses 55 and 56 extend upward from the bottom 26 and provide flat mounting surfaces upon which the guideposts 21 and 22 are fastened. The guideposts 21 and 22 each have a slightly enlarged barrel portion 21' and 22' which is flat along one side and which includes a pair of threaded openings on the flat surface. Screws 57 extend upward through openings in the bosses 55 and 56 and they are received in these threaded openings to tightly fasten the guideposts 21 and 22 in place.

Referring particularly to FIGS. 4-7, the application module 2 is securely retained in its operating position by a fastening mechanism which includes a lever 59. The lever 59 is fastened to the bottom 26 of the application module housing 25. A bolt 60 extends upward through an annular shaped guide 61 and into threaded engagement with a metal pivot bushing 62. The bushing 62 extends through an opening in the lever 59 and it has a cap 63 which holds the lever 59 in place and allows it to pivot about a vertical axis. One end of the lever 59 extends forward through a slot 64 in the housing cavity 32 where it can be manually operated by the user.

The other end of the lever 59 extends into the main unit 1 where it engages a cam plate 65 that is fastened to the bottom of the bezel 3 through a pair of integrally molded posts 66. The operating end of the lever 59 is bifurcated to provide a pair of spaced fingers 67 which support between them a roller 68. As shown best in FIG. 6, when the application module 2 is inserted into the main unit 1, the roller 68 on the operating end of the lever 59 enters the mouth portion 69 of a slot formed in the cam plate 65. At this point the electrical connectors 14-17 are in partial engagement and the guideposts 21 and 22 have properly aligned the application module 2 for complete engagement. The lever 59 is then pivoted in the clockwise direction and the roller 68 rides along a sloped cam portion 70 of the slot in the cam plate 65. A force directed along an axis parallel to the guideposts 21 and 22 is thus produced which draws the application module 2 into complete engagement with the main unit 1. Considerable frictional forces can thus be overcome merely by swinging the lever 59 from one end to the other of the slot 64.

The primary use for the terminal is to program, edit and trouble shoot industrial equipment such as programmable controllers and process controllers. Such equipment may be located in relatively clean and centrally located data processing centers or it may be located at remote locations throughout a manufacturing plant. The terminal of the present invention is compact and relatively lightweight and it includes a handle which further facilitates its use throughout a manufacturing plant. One difficulty which has been encountered in the past with such industrial terminals is that they are not necessarily set down or used in an upright position. Instead, they may be set on their side, or even upside down.

The industrial terminal of the present invention contemplates such use. Referring particularly to FIGS. 1-3 and 10, the terminal includes a pair of elastic bumpers 75 and 76 which each extend completely around the main unit 1. The forward bumper 75 extends around the perimeter of the bezel 3 and the rear bumper 76 extends around the perimeter of the back 4. The forward and rear bumpers 75 and 76 are spaced from one another and follow substantially parallel paths around the periphery of the main unit 1. Both the bezel 3 and back 4 have an integrally molded tenon 77 which extend outward from their surfaces and around their periphery. The tenons 77 engage a mating mortise 78 which is formed on the underside of each bumper 75 and 76. The bumpers 75 and 76 are thus securely retained in position to provide resilient support on the bottom, both sides, and the top of the main unit 1.

Figure 11:
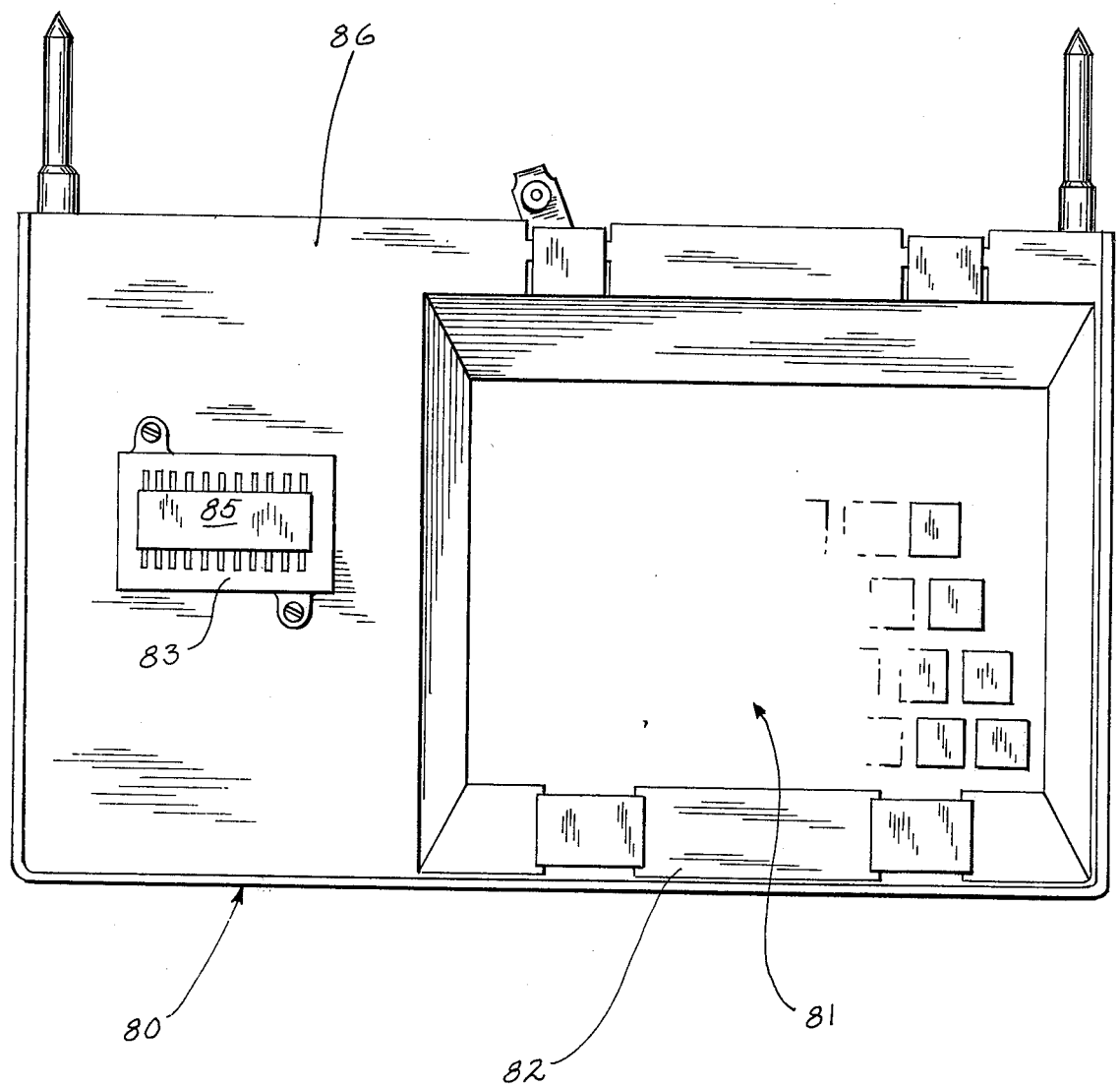
FIG. 11 is a top view of an alternative application module which may be used on the terminal of FIG. 1.

It should be apparent to those skilled in the art that numerous variations can be made from the preferred embodiment of the invention. For example, in FIG. 11 another application module 80 is shown which functions to program read-only memory circuits for use in programmable controllers. The construction of the application module 80 is nearly identical to that described above except the keyboard 81 and retainer frame 82 does not extend across the entire top 86 of the module. Instead, a socket 83 for a twenty-four pin dual-in-line integrated circuit package 85 is mounted to the lefthand side of the top 86. Commands are entered using the keyboard 81 to load a program into the memory circuit 85 plugged into the socket 83 as taught in U.S. Pat. No. 3,798,612, issued on Mar. 19, 1974 and entitled "Controller Programmer". Obviously, the circuitry in the application module 80 differs considerably from that in the application module described above, since its function is to "burn" a program into a memory circuit 85. As with the module 2 described above, however, the keyboard overlay may be changed to alter the key layout or key symbols to meet the requirements of each particular application.

We claim:

1. In a terminal for receiving data through a manual data input means and for displaying data through a data display means, the combination comprising:
   a main unit for housing circuitry and including a bezel that provides a first opening through which the data display means is directed and a second opening located beneath the first opening which provides access to the circuitry within the main unit;
   connector means mounted within the main unit, connected to said circuitry and oriented to face out through said second opening;
   guideway means formed on the main unit and oriented to face out through said second opening;
   an application module for mounting said data input means and including
   (a) a housing,
   (b) guide means supported by said housing for mating with said guideway means to align said housing over said second opening in the main unit, and
   (c) connection means mounted within said housing and being electrically coupled to said data input means, said connection means being oriented to engage and make electrical connection with said connector means in the main unit when the guide means is completely engaged with said guideway means; and
   in which said guideway means defines two cylindrical cavities, each having a longitudinal axis which is parallel to the other, and the guide means on said application module includes two guideposts which are spaced apart and parallel to one another such that they are received within said cylindrical cavities.

2. The terminal as recited in claim 1 in which said bezel is molded from a plastic material and the guideway means is integrally formed on the bezel as a pair of bosses which respectively define said cylindrical cavities.

3. The terminal as recited in claim 1 in which manually operable fastening means mounts to said application module and said main unit and it is manually operable to produce a closing force which is directed parallel to the longitudinal axes of said cylindrical cavities.

4. The terminal as recited in claim 3 in which said fastening means includes a lever which is pivotally mounted to the application module housing and which supports a roller that extends into the main unit through said second opening and into engagement with a cam plate which is mounted to the main unit, said fastening means being operable to produce said closing force when the lever is pivoted and the roller rides along a sloped slot in the cam plate.

5. In a terminal for receiving data through a keyboard and for displaying data through a cathode ray tube display, the combination comprising:
   a main unit for housing circuitry and for mounting the cathode ray tube for display through an opening in a bezel which forms the front of the main unit;
   an application module mounted to the front of the main unit beneath the cathode ray tube display opening, said application module having a top which supports a flexible membrane keyboard having a switch matrix and a separate keyboard overlay; and
   a keyboard retainer frame which is pivotally connected to the application module for rotation between an upright position in which the keyboard overlay can be removed from on top of the switch matrix and an operating position in which it retains the keyboard overlay in place over the switch matrix, said keyboard retainer frame having a window through which the keyboard may be operated when the keyboard retainer frame is in its operating position.

6. The terminal as recited in claim 5 in which the top of the application module is recessed to receive and align the switch matrix and keyboard overlay within the keyboard retainer frame window.

7. The terminal as recited in claim 6 in which clasps are formed on the keyboard retainer frame to releasably fasten it in its operating position.

8. The terminal as recited in claim 6 in which the switch matrix is electrically connected to a circuit board mounted beneath the top within said application module.

9. The terminal as recited in claim 8 in which the application module circuit board is releasably connected to a main circuit board in the main unit by a connector and the application module is removable from the main unit.

* * * * *